(12) United States Patent
Chiang

(10) Patent No.: US 6,508,376 B1
(45) Date of Patent: Jan. 21, 2003

(54) HANGING FILE BASKET

(76) Inventor: Chuang-Chih Chiang, No. 13, Chingyang Rd., Yuanpao Tsun, Taya Hsiang, Taichung County (TW)

( * ) Notice: Subject to any disclaimer, the term of this patent is extended or adjusted under 35 U.S.C. 154(b) by 0 days.

(21) Appl. No.: 09/948,683

(22) Filed: Sep. 10, 2001

(51) Int. Cl.[7] .............................. B65D 6/08; B65D 6/18
(52) U.S. Cl. ............................. 220/485; 211/46; 220/6; 312/184
(58) Field of Search ................................ 220/485, 428, 220/6, 668, 543; 206/425; 211/46; 312/184

(56) References Cited

U.S. PATENT DOCUMENTS

| | | | | |
|---|---|---|---|---|
| 1,443,901 A | * | 1/1923 | Murray | 220/485 |
| 2,529,267 A | * | 11/1950 | Sloane | 211/181.1 |
| 4,901,867 A | * | 2/1990 | Petty | 211/46 |
| 5,570,792 A | * | 11/1996 | Huang | 211/189 |
| 6,401,950 B1 | * | 6/2002 | Chiang | 220/1.5 |

* cited by examiner

Primary Examiner—Nathan J. Newhouse
Assistant Examiner—Joseph C. Merek
(74) Attorney, Agent, or Firm—Rosenberg, Klein & Lee

(57) ABSTRACT

A hanging file basket having a bottom panel, a shorter first side panel, a taller second side panel, a front panel, and a rear panel, the shorter side panel being pivoted to an upright rack at one side of the bottom panel so that a receiving space is defined between the shorter side panel and the bottom panel to receive the taller side panel and the front panel and the rear panel in a collapsed condition after the shorter side panel has been turned to horizontal, the front and rear panels having vertical and horizontal barrels detachably coupled to respective vertical angle rods and horizontal angle rods at the side panels and the upright rack of the bottom panel.

1 Claim, 4 Drawing Sheets

HANGING FILE BASKET

BACKGROUND OF THE INVENTION

The present invention relates to file baskets and, more particularly, to a hanging file basket, which is detachable, and durable in use.

In offices, hanging files are common used to hold documents in drawers or movable file units. Regular movable file units are specifically designed for keeping hanging files only without providing other functions.

SUMMARY OF THE INVENTION

The present invention has been accomplished under the circumstances in view. It is one object of the present invention to provide a hanging file basket, which is detachable. It is another object of the present invention to provide a hanging file basket, which is practical for keeping hanging files as well as other different items. According to one aspect of the present invention, the hanging file basket comprises a bottom panel, a shorter first side panel, a taller second side panel, a front panel, and a rear panel. The bottom side panel has an upright rack at one side. The shorter side panel is so pivoted to the upright rack of the bottom panel that a receiving space is defined between the shorter side panel and the bottom panel for receiving the taller side panel and the front panel and the rear panel in a collapsed condition after the shorter side panel has been turned to horizontal. According to another aspect of the present invention, the front and rear panels have vertical and horizontal barrels detachably coupled to respective vertical angle rods and horizontal angle rods at the side panels and an upright rack of the bottom panel.

DETAILED DESCRIPTION OF THE PREFERRED EMBODIMENT

Figure 2:
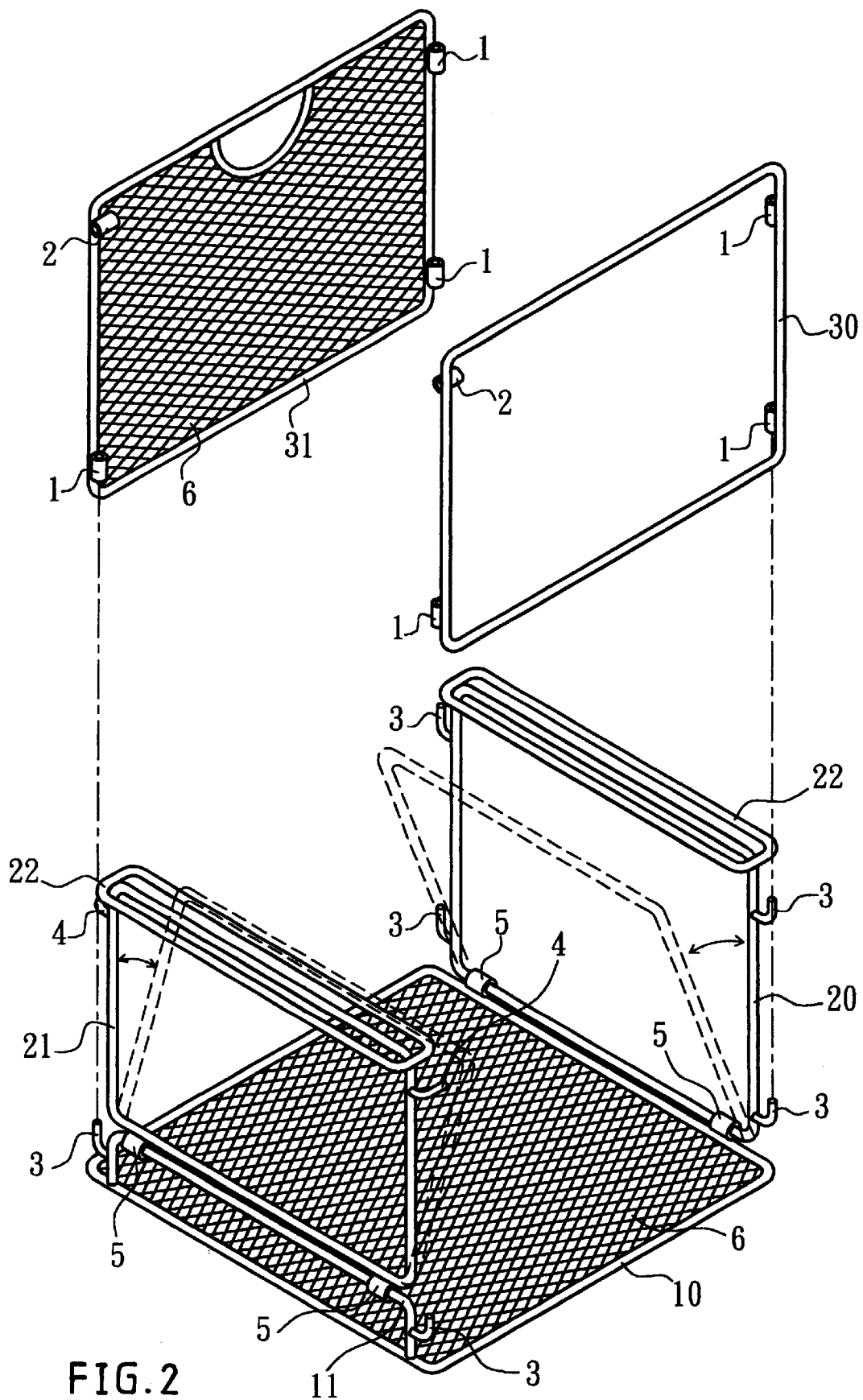
FIG. 2 is an exploded view of the hanging file basket according to the present invention.

Referring to FIGS. from 1 through 3, a hanging file basket is shown comprised of a rectangular bottom panel 10, two side panels 20 and 21, a front panel 30, and a rear panel 31. The bottom panel 10 and the rear panel 31 each have a meshed structure 6. Connectors 5 are welded to two opposite sides of the bottom panel 10. The side panels 20 and 21 are respectively pivoted to the connectors 5, and turned relative to the bottom panel 10 between the collapsed horizontal position (see FIG. 3) and the vertical operative position (see FIGS. 2 and 3).

The bottom panel 10 has a substantially inverted u-shaped vertical rack 11 disposed at one side. The side panels 20 and 21 have different heights. One side panel, namely, the shorter side panel 21 is pivoted to the connectors 5 at the top side of the inverted u-shaped vertical rack 11. When turned the shorter side panel 21 inwards relative to the bottom panel 10 from the vertical operative position to the collapsed horizontal position, a vertical space W is left between the bottom panel 10 and the shorter side panel 21 for receiving the taller side panel 20, the front panel 30, and the rear panel 31 in the collapsed condition (see FIG. 3).

Vertical angle rods 3 are respectively welded to two opposite lateral sides of the taller side panel 20 and the inverted u-shaped vertical rack 11 of the bottom panel 10. Two horizontal angle rods 4 are respectively welded to two opposite lateral sides of the shorter side panel 21. Vertical barrels 1 and horizontal barrels 2 are respectively weld ed to the front and rear panels 30 and 31 at locations corresponding to the vertical angle rods 3 and the horizontal angle rods 4. After the side panels 20 and 21 have been turned upwards from the bottom panel 3 to vertical, the vertical barrels 1 and horizontal barrels 2 are respectively coupled to the vertical angle rods 3 and the horizontal angle rods 4, keeping the front and rear panels 30 and 31 connected between the side panels 20 and 21 in vertical.

Figure 3:
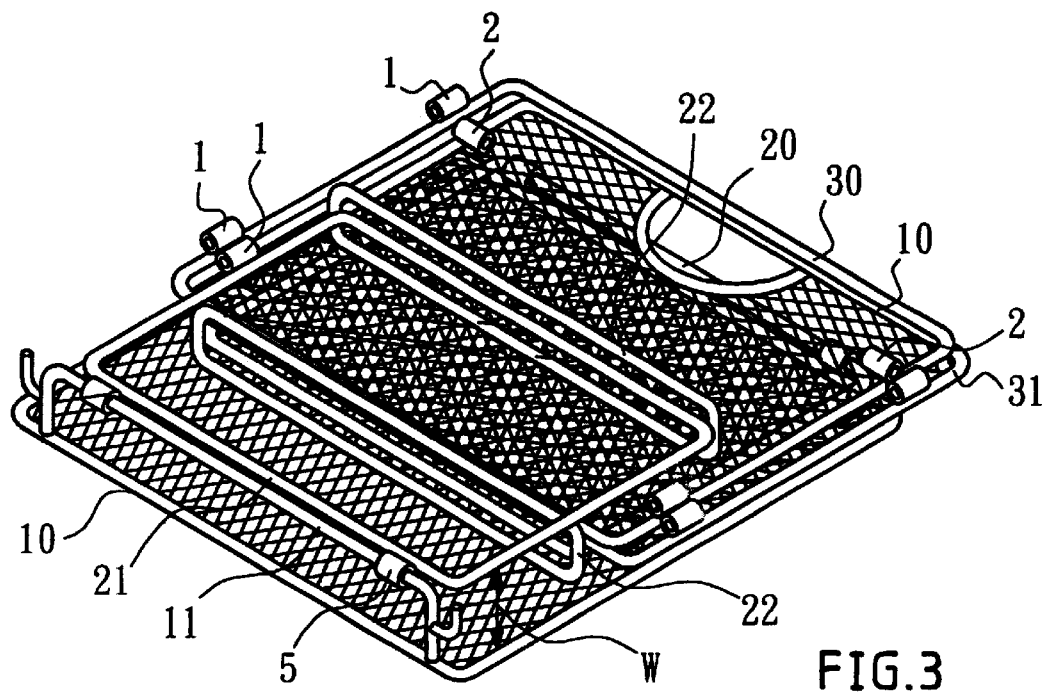
FIG. 3 shows the hanging file basket collapsed according to the present invention.

When not in use, the front and rear panels 30 and 31 are detached from the side panels 20 and 21 by disconnecting the respective vertical angle rods 3 and horizontal angle rods 4 from the respective vertical barrels 1 and horizontal barrels 2, and then the taller side panel 20 is turned inwards and rested on the top side of the bottom panel 10, and then the detached front and rear panels 30 and 31 are attached together and put on the collapsed taller side panel 20, and then the shorter side panel 21 is turned inwards from vertical to horizontal and rested on the front and rear panels 30 and 31 above the bottom panel 10 and the taller side panel 20 (see FIG. 3).

Figure 1:
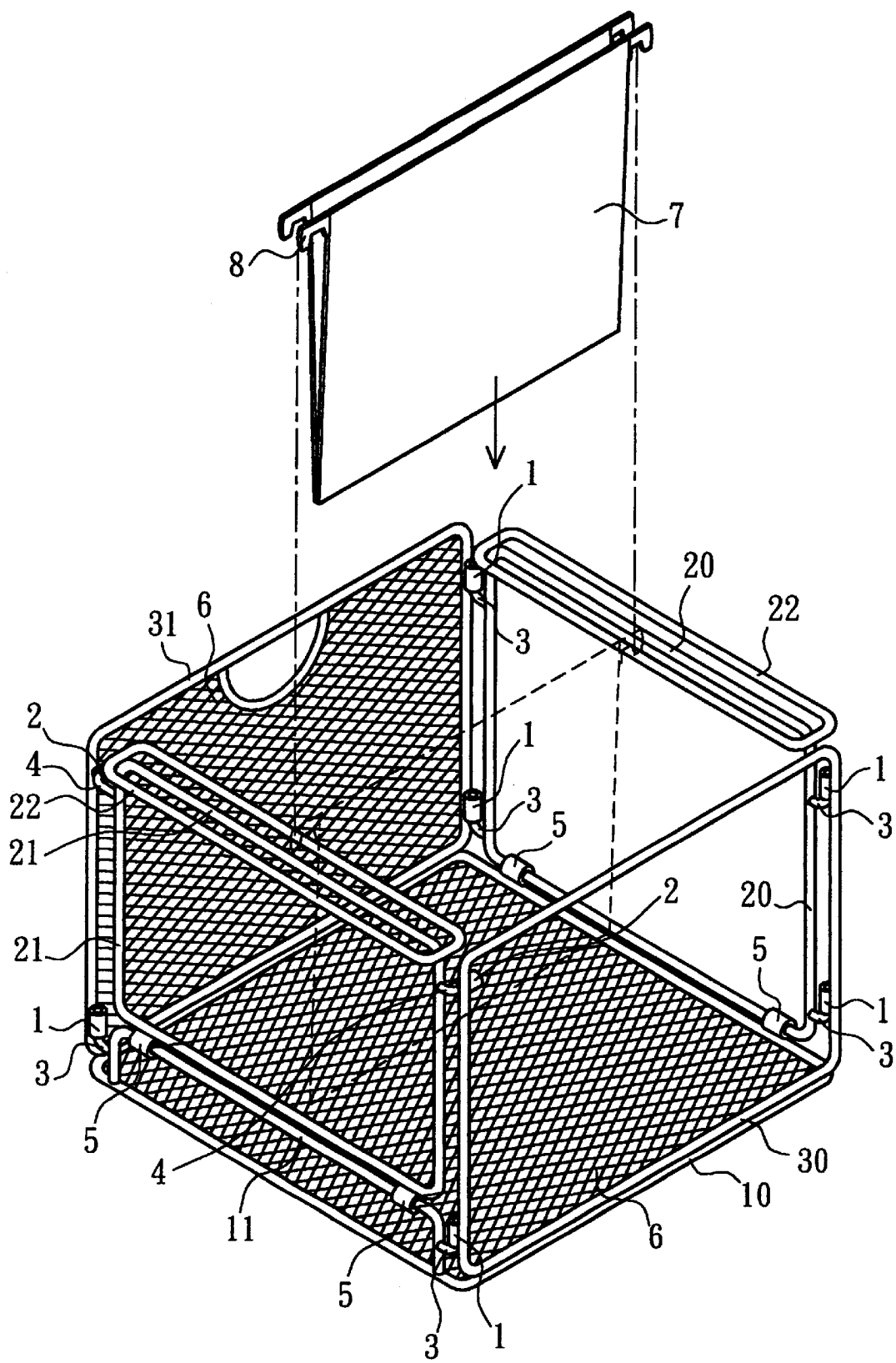
FIG. 1 is a perspective view of a hanging file basket according to the present invention.
Figure 5:
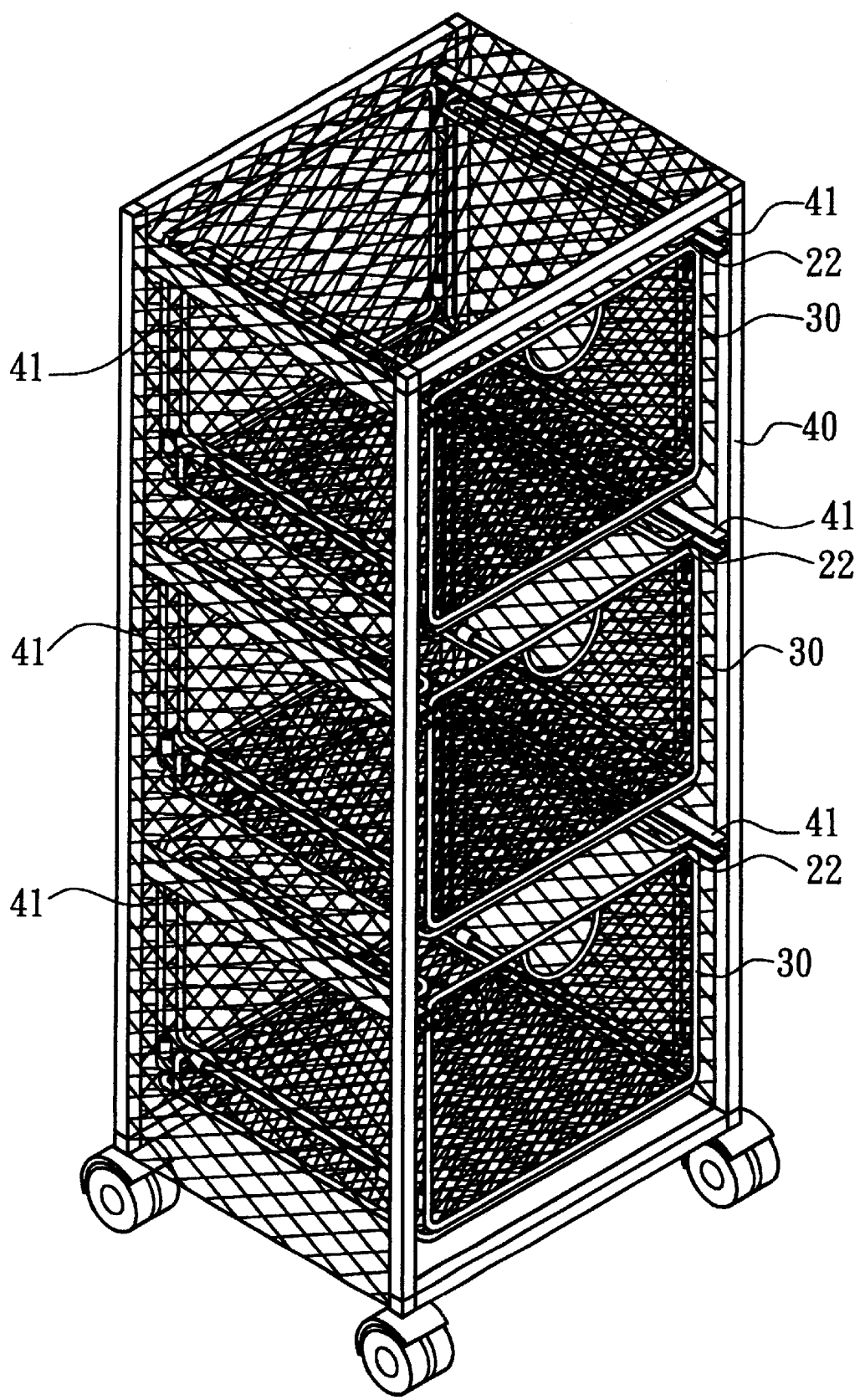
FIG. 5 shows an application example of the present invention.

Referring to FIG. 5 and FIGS. 1 and 2 again, the side panels 20 and 21 each have a horizontal top bracket 22 respectively extending from the sides. When loading hanging files 7 in the hanging file basket, the two hanging end rods 8 of each hanging file 7 are respectively hung on the horizontal top bracket 22 of each of the side panels 20 and 21. By means of the horizontal top brackets 22, the hanging file rack can be suspended from transverse side bars 41 of a movable rack 40.

Figure 4:
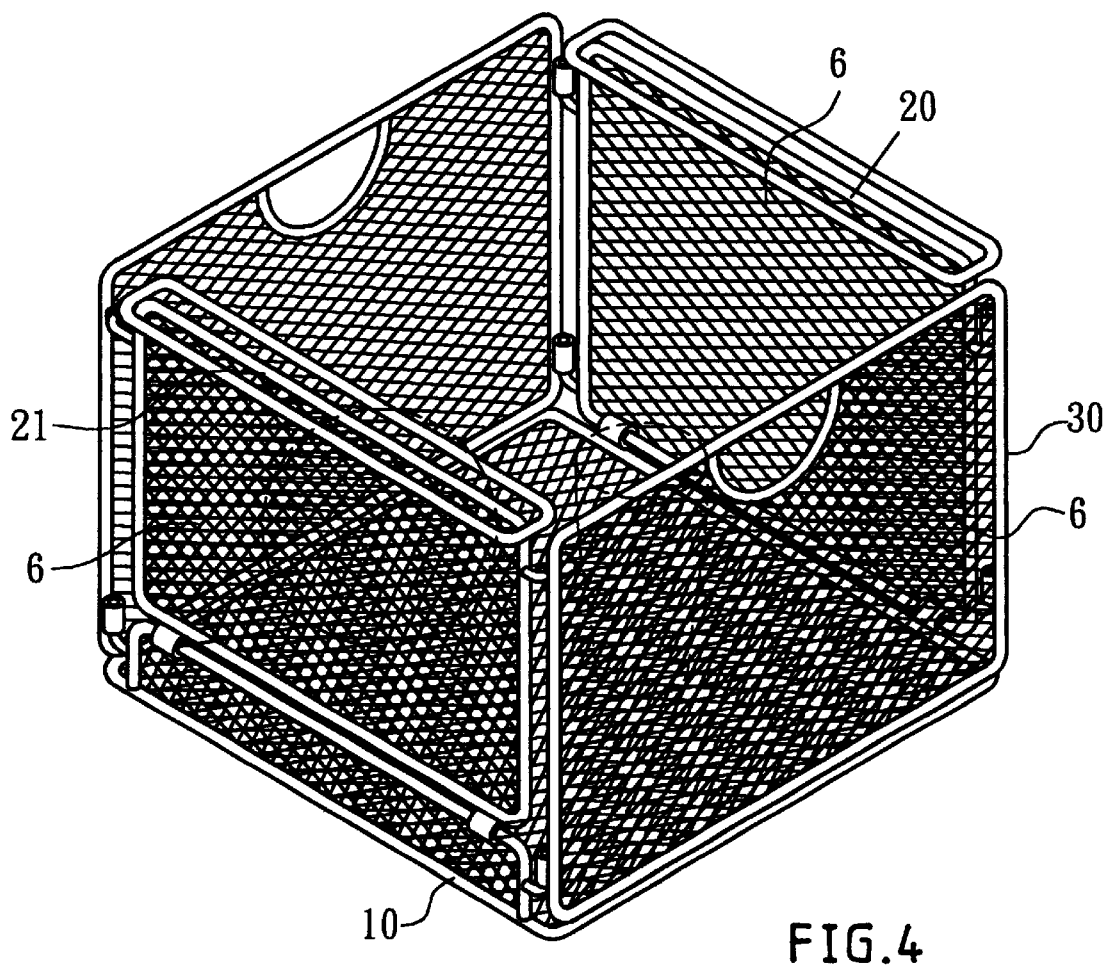
FIG. 4 is a perspective view of an alternate form of the present invention.

FIG. 4 shows an alternate form of the present invention. According to this alternate form, the side panels 20 and 21, the front panel 30, the rear panel 31, and the bottom panel 10 each have a meshed structure 6. This alternate form can be used as a personal storage basket for keeping any of a variety of personal items.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A hanging file basket comprising:
   a rectangular bottom panel, said rectangular bottom panel comprising a substantially inverted u-shaped upright rack disposed atone lateral side thereof;
   a first side panel pivoted to said inverted u-shaped upright rack, said first side panel having a horizontal top bracket for hanging and for supporting hanging file;
   a second side panel pivoted to one lateral side of said bottom panel opposite to said inverted u-shaped upright rack, said second side panel having a horizontal top bracket for hanging and for supporting hanging file and a height substantially equal to the combination height of said first side panel and said inverted u-shaped upright rack;

a front panel and a rear panel respectively detachably connected between said first side panel and said second side panel; and a coupling structure for enabling said front panel and said rear panel to be detachably coupled to said first side panel and said second side panel, said coupling structure comprising a plurality of vertical angle rods respectively welded to two opposite lateral sides of said second side panel and two opposite lateral sides of said inverted u-shaped vertical rack of said bottom panel, two horizontal angle rods respectively welded to two opposite lateral sides of said first side panels, and a plurality of vertical barrels and horizontal barrels respectively welded to said front panel and said rear panel at two sides for coupling to said vertical angle rods and said horizontal angle rods respectively.

* * * * *